(12) United States Patent
Yu et al.

(10) Patent No.: US 8,754,003 B2
(45) Date of Patent: Jun. 17, 2014

(54) METHOD TO INCREASE VOLUMETRIC HYDROGEN STORAGE CAPACITY FOR PT/AC MATERIALS

(75) Inventors: Ming-Sheng Yu, Taipei (TW); Hsiu-Chu Wu, Pingtung County (TW); Haw-Yeu Chuang, Taoyuan County (TW); Huan-Hsiung Tseng, Miaoli County (TW); Cheng-Hsiang Tung, Taoyuan County (TW)

(73) Assignee: Institute of Nuclear Energy Research Atomic Energy Council, Executive Yuan, Taoyuan County (TW)

(*) Notice: Subject to any disclaimer, the term of this patent is extended or adjusted under 35 U.S.C. 154(b) by 437 days.

(21) Appl. No.: 13/334,317

(22) Filed: Dec. 22, 2011

(65) Prior Publication Data
US 2013/0072378 A1    Mar. 21, 2013

(30) Foreign Application Priority Data
Sep. 20, 2011    (TW) .............................. 100133751 A

(51) Int. Cl.
*B01J 23/40* (2006.01)
*C01B 31/08* (2006.01)
*B01J 21/18* (2006.01)
*B01J 37/02* (2006.01)
*C01B 3/00* (2006.01)
*B01J 37/06* (2006.01)
*B01J 23/42* (2006.01)
*B01J 37/08* (2006.01)

(52) U.S. Cl.
CPC .............. *B01J 21/18* (2013.01); *B01J 37/0207* (2013.01); *B01J 37/0201* (2013.01); *C01B 3/0005* (2013.01); *B01J 37/06* (2013.01); *B01J 23/42* (2013.01); *B01J 37/084* (2013.01)
USPC ........... 502/436; 502/185; 502/416; 502/418; 502/423

(58) Field of Classification Search
None
See application file for complete search history.

(56) References Cited

U.S. PATENT DOCUMENTS 6,309,446 B1 * 10/2001 Nakanoya et al. .............. 95/102
2007/0082816 A1 * 4/2007 Yang et al. .................... 502/417

* cited by examiner

*Primary Examiner* — Melvin C Mayes
*Assistant Examiner* — Colin W Slifka
(74) *Attorney, Agent, or Firm* — WPAT, PC; Justin King

(57) ABSTRACT

A novel method to increase volumetric hydrogen storage capacity for Pt/AC materials, which comprises a material providing step, an acid washing step, a glucose mixing step, a pellet pressing step combining liquefaction and carbonization, a impurity removing step, a mixed solution introducing step, and a washing and filtering step to provide a method for high quality hydrogen storage material production by supporting platinum on active carbon.

7 Claims, 2 Drawing Sheets

METHOD TO INCREASE VOLUMETRIC HYDROGEN STORAGE CAPACITY FOR PT/AC MATERIALS

RELATED APPLICATIONS

This application claims priority to Taiwan Application Serial Number 100133751, filed on Sep. 20, 2011, which is herein incorporated by reference.

FIELD OF THE INVENTION

The present invention relates to a method for increasing volumetric hydrogen storage capacity of active carbon supported Pt materials (Pt/AC materials). More particularly, the present invention relates a method using sample powders of AC materials to prepare a sample pellet of Pt/AC for hydrogen storage with a substantially increased volumetric hydrogen storage capacity.

BACKGROUND ART

Hydrogen is one of the fuels which will most likely replace fossil fuels in the future. Therefore a lot of manpower and material resources have been invested in research and development of hydrogen fuel in recent years. Now, the focus of such development is on hydrogen production, hydrogen storage, hydrogen transport and the combination of hydrogen and fuel cells. In early days, United States Department of Energy (U.S.DOE) had proposed a hydrogen storage standard for a hydrogen powered vehicle based on achieving a driving range of 500 km. The standard hydrogen storage is aimed to be 9 wt % by 2015.

Hydrogen has a major by-product, water, which has several advantages such as low pollution. Further, because hydrogen is a secondary fuel and it is abundant and recyclable, a more efficient and diverse supply and demand system of sustained energies may be constructed as long as technical difficulties in production, storage, transport and application are overcome. Thus every country considers it as the most preferable secondary fuel to replace fossil fuel, so as to increase national energy security and reduce air pollution. Therefore, development and application of hydrogen have received a great deal of attention recently. Hydrogen storage technology has to be enhanced in order to easily use hydrogen. The goals of hydrogen storage technology includes: gravimetric storage capacity, volumetric storage capacity, hydrogen release rate, and operating temperature etc.

The present method of hydrogen storage is mainly high-pressure storage or low-temperature storage (20K) system in which liquid form is most preferred. The current gravimetric storage density is about 15 wt % and the highest density reaches 18 wt %. However, a gravimetric storage density of only about 2.3 kW/hl is not ideal. There is still a gap between the current storage technology and the goal set for 2015. Furthermore, the temperature of hydrogen storage is too low to meet the demand for real application in reality. Thus the present study of hydrogen fuel is focused on a high storage capacity at normal temperature.

Research of physical absorption and chemical absorption between hydrogen and materials, a major factor of hydrogen storage, is mainly focused on active carbon, single-wall carbon nanotubes, and microporous metal-organic frameworks (MOFs), which is the most popular research topic now. A sample pellet of hydrogen storage prepared by said three materials will absorb a large amount of hydrogen by physical absorption and chemical absorption.

From a considerable amount of previous research, a high hydrogen storage capacity at normal temperature is believed to be an important index for application in reality and play a key role in carbon materials in the future to achieve the goal of effective hydrogen storage. In addition, in order to improve physical absorptive ability, there must be a breakthrough in the following three factors affecting hydrogen storage ability including: binding energy of hydrogen to absorption materials, surface area provided for hydrogen storage, and bulk density of sample pellet of hydrogen storage.

As for hydrogen storage of carbon materials, the use of active carbon is the main developing point in which the development of Pt/AC materials is improved increasingly, wherein the gravimetric storage capacity thereof is greater than 11 wt % in 6.9 MPa at room temperature. However, the apparent density is only about 0.35 g/cm$^3$ after supported by Pt particles in proper proportion by weight due to the distribution of active carbon powder with size of 0.1~20 μm and specific surface area of about 1800 m$^2$/g. Thus, the converted volumetric hydrogen storage density is only about 38 KgH$^{32}$/m$^3$. Such a hydrogen storage capacity filled in a hydrogen cartridge is difficult to satisfy the DOE's target.

AC pellets were formed in a previous method by directly pressing AC powders at room temperature, and the apparent density will be substantially increased to about 0.9 g/cm$^3$. However, the catalyst Pt particle did not uniformly distribute throughout AC pellets even with vacuum suction method, causing the substantial decrease in gravimetric hydrogen absorbing capacity. Therefore, how to prepare a Pt/AC pellet with slightly increased apparent density as well as increased volumetric hydrogen storage capacity is still a challenge.

SUMMARY

In view of the above-mentioned drawback, the present invention provides a method to increase volumetric hydrogen storage capacity of Pt/AC materials by means of preparing a pellet with higher apparent density. At the same time, it still maintain higher gravimetric hydrogen storage uptake.

A method for increasing volumetric hydrogen storage capacity of active carbon supported Pt materials (Pt/AC materials) is provided herein, comprising steps of:

(a) providing an active carbon;

(b) acid washing the active carbon in an acidic solution;

(c) mixing glucose with the active carbon in a predetermined ratio to form a mixture;

(d) forming a sample pellet of unsupported catalysts by putting the mixture in a mold apparatus, heating for liquefaction at 150° C.~200° C. and increasing the temperature up to 220° C.~280° C. for carbonization under an inert gas condition.

(e) removing impurities by putting the sample pellet of unsupported catalysts from the mold apparatus into a vacuum container, connecting the vacuum container with a vacuum pump, and removing residual impurities by heating to 180° C.~220° C. over 5 hours under the vacuum condition of 10$^{-5}$ to 10$^{-6}$ torr.

(f) Introducing a mixed solution of chloroplatinic acid and ethylene glycol into the vacuum container after interrupting the connection between the vacuum container and the vacuum pump, whereby the pores of the sample pellet of unsupported catalysts are filled with the mixed solution, thus the Pt catalyst will uniformly distribute throughout the AC pellet;

(g) washing and filtering the sample pellet of supported catalysts with a solution until forming a clear filtrate to obtain a sample Pt/AC pellet for hydrogen storage;

According to the present method, a sample pellet, with high apparent density as well as high volumetric hydrogen storage capacity, is prepared from a Pt/AC powder that previously proved has high gravimetric hydrogen storage capacity. Therefore, a hydrogen storage cartridge filled with Pt/AC pellets prepared using the method mentioned above will provide higher amount of hydrogen than that filled with Pt/AC powder only. Thus, a potential market is expected when using this Pt/AC pellets with higher volumetric hydrogen storage capacity.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Reference will now be made in detail to various embodiments of the invention, examples of which may be illustrated in the accompanying drawings. While the invention will be described in conjunction with various embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following disclosure numerous specific details are given to provide a thorough understanding of the invention. However, it will be apparent to one skilled in the art that the present invention may be practiced without these specific details. In other instances, well-known methods, procedures, components, and circuits have not been described in detail, to avoid unnecessarily obscuring aspects of the present invention.

Figure 1:
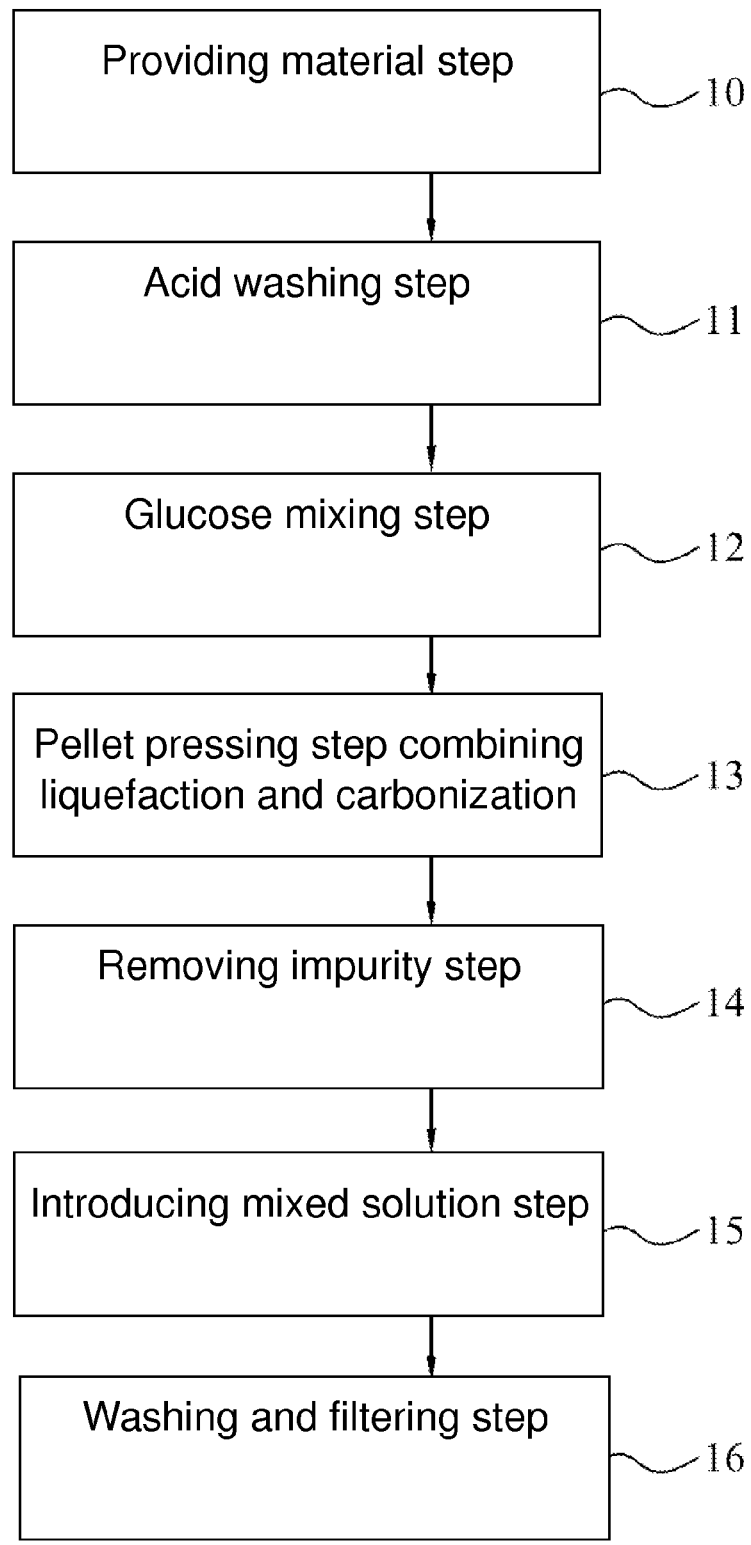
FIG. 1 illustrates a flow chart according to the present method for increasing volumetric hydrogen storage capacity of Pt/AC materials.

FIG. 1 illustrates a flow chart according to the present invention, wherein a method for increasing volumetric hydrogen storage capacity of Pt/AC materials was provided, comprising:

A providing material step 10, wherein an active carbon was provided.

A acid washing step 11, wherein the active carbon was acid washed in an acidic solution which was a mixed solution of nitric acid and sulfuric acid. By this step 11, the amount of oxygen-containing groups could be kept on the active carbon.

A glucose mixing step 12, wherein the active carbon was mixed with glucose in a predetermined ratio to form a mixture.

A pellet pressing step combining liquefaction and carbonization 13, wherein a sample pellet of unsupported catalysts was formed by putting the mixture in a mold apparatus, heating for liquefaction (wetting) at 150° C.~200° C. (most preferably at 180° C.) and increasing the temperature up to 220° C.~280° C. (most preferably at 250° C.) for carbonization under an inert gas condition. In a preferred embodiment, the inert gas might be helium gas, the mold apparatus might be the mold having springs and threads for continuous pressing and the heating device might be a tube furnace.

A removing impurity step 14, wherein impurities such as water or other adsorbates in the sample pellet of supported catalyst were removed by putting the sample pellet of supported catalysts from the mold apparatus into a vacuum container, connecting the vacuum container with a vacuum pump, followed by residual impurities such as water or other adsorbates being completely removed by heating to 180° C.~220° C. (most preferably at 200° C.) over 5 hours under the vacuum condition of $10^{-5}$ to $10^{-6}$ torr. In a preferred embodiment, the vacuum container might be a stainless steel vacuum flask.

Introducing mixed solution step 15, wherein a mixed solution of chloroplatinic acid and ethylene glycol was introduced into the vacuum container after interrupting the connection between the vacuum container and the vacuum pump such that the pores of the sample pellet of unsupported catalysts were filled with the mixed solution.

A washing and filtering step 16, wherein the sample pellet of supported catalysts was washed and filtered with a solution until a clear filtrate was obtained. Then a sample pellet for hydrogen storage was obtained.

When glucose had a higher ratio in that mixture, the sample pellet formed after carbonization had a higher apparent density but that showed a decreased gravimetric hydrogen uptake in the step 12. However, a better volumetric hydrogen storage capacity might be obtained due to the increasing of the apparent density of Pt/AC pellet. That is kind of trade-off. Thus, different sample pellets for hydrogen storage with various apparent densities could be prepared in the ratio (active carbon to glucose) of 1:1, 1:1.5 and 1:2, respectively.

Although in the step 13, the number of pores on active carbon would be decreased (i.e. the gravimetric absorbed capacity would be decreased) after liquefaction, the carbon formed had a higher density due to glucose carbonization and continuous pressing in liquefaction. Thus, the formed sample pellet for hydrogen storage was more compact and had a substantially increased apparent density.

Figure 2:
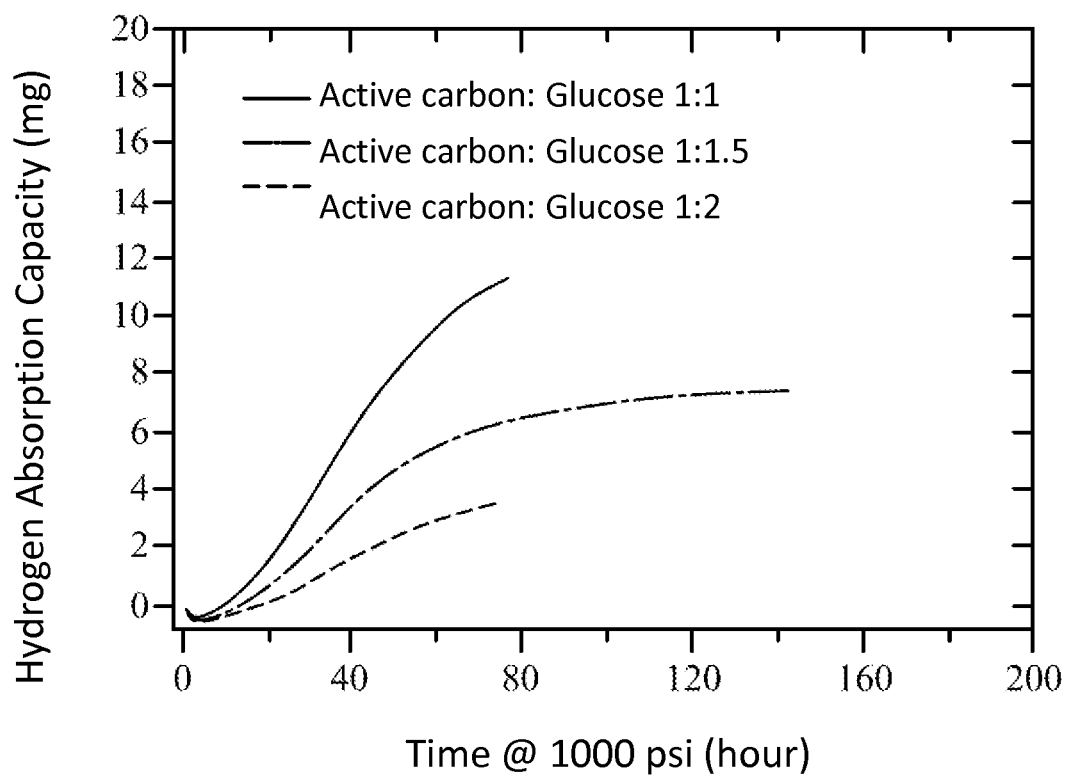
FIG. 2 illustrates a diagram of weight changes of three different sample pellets for hydrogen storage before and after absorbing hydrogen.

The apparent density for various sample pellets, prepared in the above-mentioned ratio (1:1, 1:1.5 and 1:2 respectively), could be obtained by measuring their weight and their apparent volume. All these apparent density, increasing with the increasing of the glucose ratio, were between 0.58~0.62. Further, all sample pellets for hydrogen storage had a greater apparent density than that of activated carbon supported platinum catalyst in powder form (about an apparent density of 0.35). FIG. 2 illustrated weight changes of these sample pellets for hydrogen storage before and after absorbing hydrogen, which were determined by a Thermo Gravimetric Analyzer under a hydrogen flow. According to the results, even the 1:1 sample pellets had a gravimetric storage density of 8.5% or more. Further, the volumetric hydrogen storage capacity would increase from 38 kg $H_2/m^3$ (in powder form) to 50 kg $H_2/m^3$ or more after converting from the multiplying gravimetric storage capacity by apparent density. Such results was demonstrated to be a substantially increase.

Above all, Pt/AC sample pellets having a high apparent density and volumetric hydrogen storage density would be prepared according to the present method. In addition to their original excellent gravimetric storage capacity, such prepared sample pellets would increase the volumetric hydrogen storage capacity and have an enormous market potential thereby.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for increasing volumetric hydrogen storage capacity of active carbon supported Pt materials (Pt/AC materials), comprising steps of:
   (a) providing an active carbon;
   (b) acid washing the active carbon in an acidic solution;
   (c) mixing glucose with the active carbon in a predetermined ratio to form a mixture;
   (d) forming a sample pellet of unsupported catalysts by putting the mixture in a mold apparatus, heating for liquefaction at 150° C.~200° C. and increasing the temperature up to 220° C.~280° C. for carbonization under an inert gas condition;
   (e) removing impurities by putting the sample pellet of unsupported catalysts from the mold apparatus into a vacuum container, connecting the vacuum container with a vacuum pump, and removing residual impurities by heating to 180° C.~220° C. over 5 hours under the vacuum condition of $10^{-5}$ to $10^{-6}$ torr;
   (f) introducing a mixed solution of chloroplatinic acid and ethylene glycol into the vacuum container after interrupting the connection between the vacuum container and the vacuum pump, whereby pores of the sample pellet of unsupported catalysts are filled with the mixed solution;
   (g) washing and filtering the sample pellet of supported catalysts with a solution until forming a clear filtrate to obtain a sample pellet for hydrogen storage.

2. The method according to claim 1, wherein the acidic solution in step (b) is a mixed solution of nitric acid and sulfuric acid.

3. The method according to claim 2, wherein the inert gas in step (d) is helium gas.

4. The method according to claim 3, wherein the mold apparatus in step (d) is a mold having springs and threads for continuous pressing.

5. The method according to claim 2, wherein a device for heating in step (d) is a tube furnace.

6. The method according to claim 2, wherein the vacuum container in step (e) is a stainless steel vacuum flask.

7. The method according to claim 2, wherein the solution in step (g) is water.

* * * * *